United States Patent [19]

Janzen, Sr. et al.

[11] Patent Number: 4,538,434

[45] Date of Patent: Sep. 3, 1985

[54] SECURITY HOUSING FOR OIL STORAGE TANK VALVE

[76] Inventors: James H. Janzen, Sr., 714 W. 71st St.; James H. Janzen, Jr., 716 W. 71st St., both of Tulsa, Okla. 74132

[21] Appl. No.: 587,495

[22] Filed: Mar. 9, 1984

[51] Int. Cl.³ .............................................. G05G 5/00
[52] U.S. Cl. ........................................ 70/178; 70/179; 70/180; 70/212; 70/232
[58] Field of Search ............. 70/54, 56, 55, 159, 70/160, 175, 176, 177, 178, 179, 180, 211, 212, 229, 232

[56] References Cited

U.S. PATENT DOCUMENTS

| 280,912 | 7/1883 | Connolly | 70/178 |
| 748,720 | 1/1904 | Glazier | 70/178 |
| 4,300,369 | 11/1981 | Besecker | 70/56 |

FOREIGN PATENT DOCUMENTS

| 18085 | of 1914 | United Kingdom | 70/232 |
| 368453 | 3/1932 | United Kingdom | 70/178 |

Primary Examiner—Robert L. Wolfe
Attorney, Agent, or Firm—Head, Johnson & Stevenson

[57] ABSTRACT

A security housing for surrounding a valve attached to a storage tank comprising a pair of hinged clamshell structures (e.g., hollow semi-cylindrical enclosures) that are also pivotally hinged to the storage tank adjacent to an outlet pipe with valve such that the clamshell structure when closed surrounds the valve, yet swings away from the valve to allow access thereto. The security housing is further equipped with an opening which allows manual access to a padlock and padlock eyelets on the interior of the housing. Such a structure is useful to prevent unauthorized access to crude oil stored in the oil field and the like.

6 Claims, 3 Drawing Figures

SECURITY HOUSING FOR OIL STORAGE TANK VALVE

BACKGROUND OF THE INVENTION

1. Field of the Invention

This invention relates to a security housing for locking oil storage tank valves. More specifically, the invention relates to a clamshell structure that attaches to an oil storage tank in the vicinity of an outlet valve and pivotally encloses the valve, thus restricting physical access to the locked valve.

2. Brief Description of the Prior Art

Problems associated with unauthorized access to stored petrochemicals or refined and crude oil, particularly in remote field storage tanks, are well recognized and extremely costly whether involving mistakes, accident, vandalism or theft. Consequently, it is a common practice to provide some form of locking mechanism for preventing unauthorized opening of the oil stroage tank valves. It is known to design valves with lock eyelets wherein a padlock can be employed to lock the valve mechanism. However, in the case of theft, an exposed padlock can be easily removed by use of a chain cutter or the like. Thus, the need for a convenient and reliable method of detering illegal access to oil storage tank valves still exists.

SUMMARY OF THE INVENTION

In view of the problems associated with using an exposed padlock to lack a valve, we have discovered an improved security housing for locking a storage tank valve comprising:

(a) a first half housing adapted to surround and enclose one half of a valve attached to a storage tank, wherein the first half housing consists of an essentially rigid exterior surface and hollow concave interior terminating in an essentially planar perimeter that aligns with the perimeter of a second half housing;

(b) a second half housing adapted to surround and enclose the other half of a valve attached to a storage tank wherein the second half housing consists of an essentially rigid exterior surface and hollow concave interior terminating in an essentially planar perimeter that aligns with the perimeter of the first half housing;

(c) a first hinge means attached to a portion of the perimeter of both first and second half housings such that the first and second half housings pivotally open and close about the hinge and reversibly surround the valve;

(d) at least one notched opening in the perimeter of the half housing adapted to allow the half housing to close around the valve with the pipe leading from the storage tank to the valve passing through the opening;

(e) a second hinge means attached to the security housing essentially adjacent to the notched opening when the security housing is closed around the valve;

(f) a support means pivotally attached to the second hinged means and adapted to be permanently fastened to the storage tank near the valve;

(g) a pair of padlock eyelet means wherein each of the padlock eyelet means is individually attached to the perimeter of each of the separate half housings such that the eyelets of the padlock eyelet means project inwardly to the half housings and align and accept a padlock when the half housings are closed around the valve; and (h) an opening within the security housing adapted to allow for manual insertion and removal of a padlock used to lock the safety housing.

In one preferred embodiment of the present invention, a cylindrical security housing is provided by use of a pair of hollow half-cylinders hinged to each other and hinged to the storage tank such that they can clamshell over and enclose the valve. An internal padlock is then used by inserting or removing it manually through a small opening in the top or bottom of the cylindrical housing.

It is an object of the present invention to provide a convenient and reliable security housing that completely surrounds a storage valve and locks, thus deterring unauthorized opening or closing of the valve. It is a further object to provide a security housing that deters the use of conventional cutting tools and techniques to remove a locked padlock. Fulfillment of these objects and the presence and fulfillment of additional objects will be apparent upon a complete reading of the specification and claims taken in conjunction with the attached drawings.

BRIEF DESCRIPTIONOF THE DRAWINGS

DESCRIPTION OF THE PREFERRED EMBODIMENTS

Figure 1:
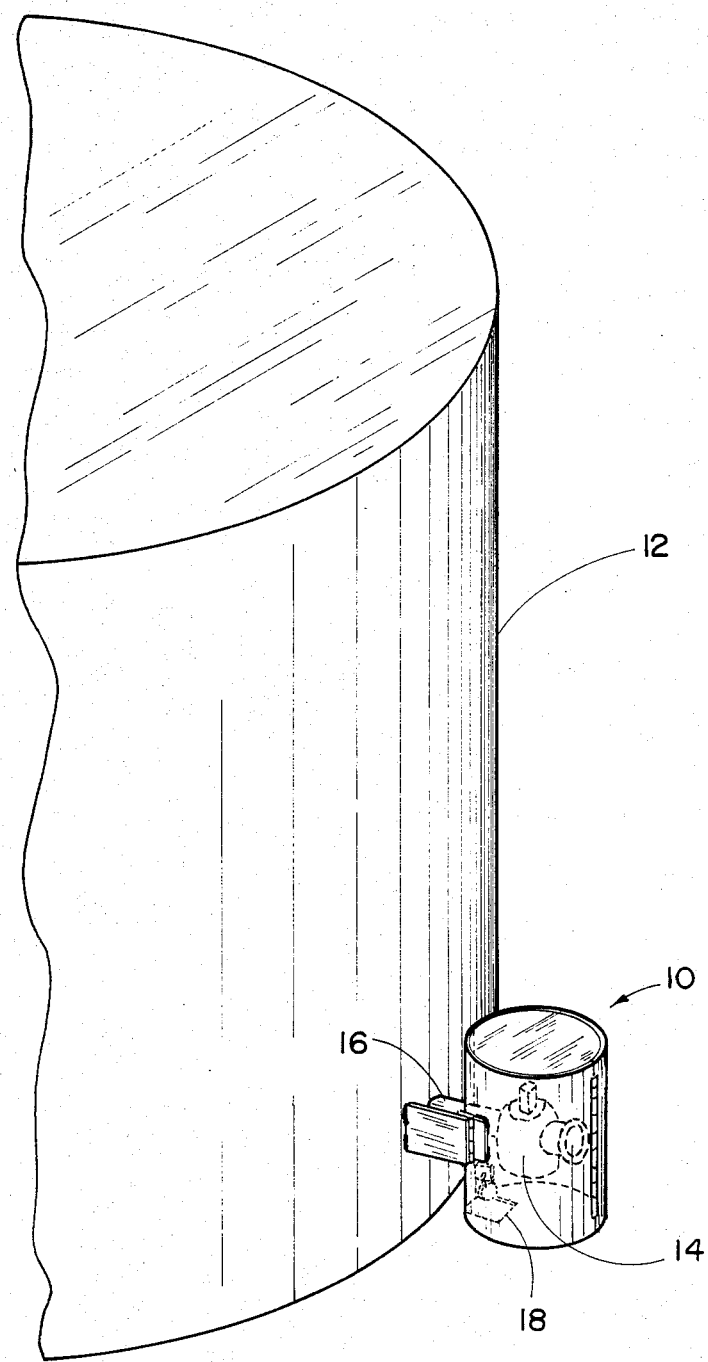
FIG. 1 is a partial cut-away view an oil field storage tank with the storage tank valve being enclosed by the security housing according to the present invention.

The storage tank security valve enclosure according to the present invention, how it functions, how it differs from the prior art devices and the advantages of using the same can perhaps be best explained and understood by reference to the drawing. As illustrated in FIG. 1, the security housing, generally designated by the numeral 10, is intended to be permanently attached to the exterior of a crude oil storage tank 12 or the like in the vicinity of an external valve 14 and pipe 16. After permanent attachment of the security housing 10 to the tank 12, the clamshell housing can be closed around the valve 14 and locked in place by reaching into the housing 10 through an external opening 18 and placing a padlock on a set of internal latches.

Figure 2:
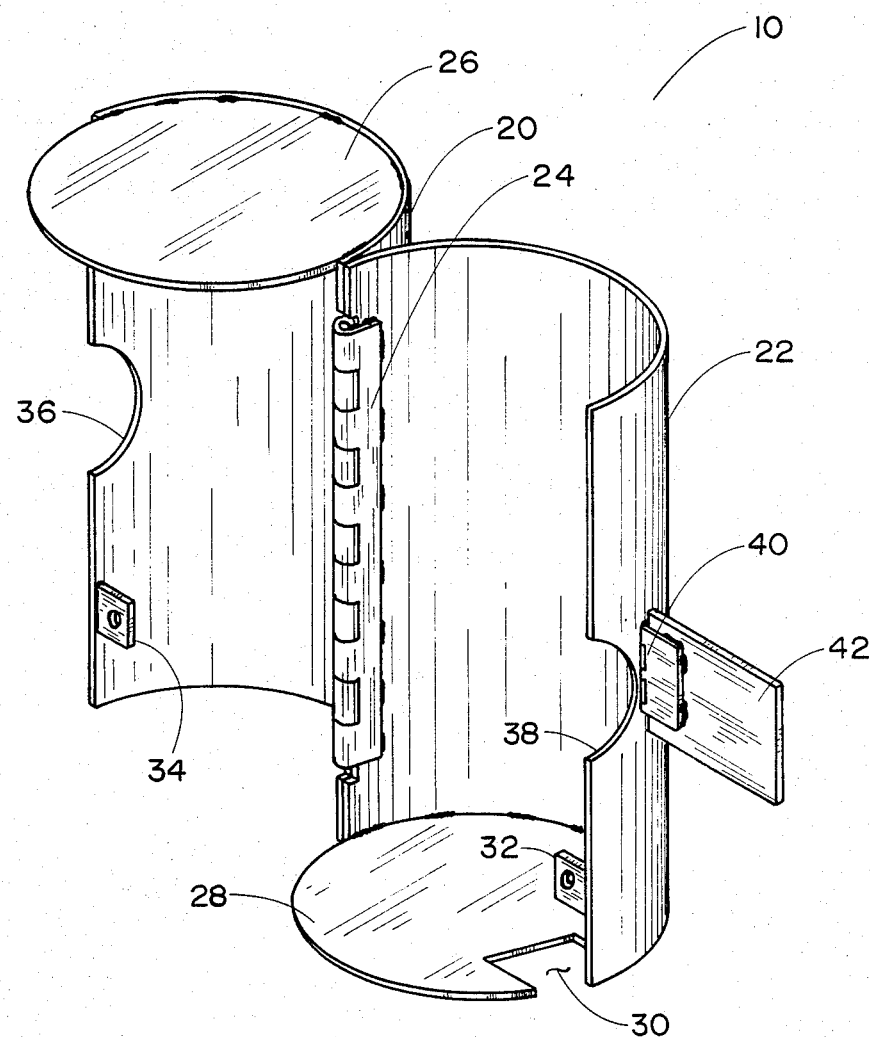
FIG. 2 is a perspective view of the security housing of FIG. 1 in an open configuration before installation to the storage tank and valve.

As illustrated in FIG. 2, the security housing 10 is made up of a pair of similar half-cylindrical clamshell structures 20 and 22 connected to each other by a hinge 24. In this particular embodiment, one half clamshell structure 20 has a top circular lid 26 and no bottom. The other half clamshell structure 22 has a circular bottom 28 and, in this case, the bottom 28 has an opening 30 for manuall access to the interior when installing or removing a padlock from eyelets 32 and 34. As further illustrated in FIG. 2, a pair of notches 36 and 38 are positioned on the perimeter of the clamshells 20 and 22 opposite the hinge 24. Adjacent to the notch 38 is a second hinge 40 and a fastening plate 42.

In order to install the security housing 10 onto a storage tank, the device is positioned over a valve mounted on the end of a pipe and the distance between the closed clamshell security housing and the storage tank is determined. The fastening plate can then be adjusted to fit by bending or cutting at the appropriate length. The housing is then held in position and the fastening plate is mounted to the tank preferably by welding, riveting or other permanent fastening process.

Once fastened permanently to the storage tank, the security housing easily pivots on and off the valve to be protected. In the closed configuration, the two half shells completely enclose the valve with the valve pipe passing through the notches. In this position, one can manually reach through the hole in the bottom of the security housing and either fasten or remove a padlock from the eyelets of the latch. However, with the padlock installed, it is relatively difficult, if not impossible, to insert a conventional chain link shear mechanism or other cutting tool to physically remove the padlock. Since the storage tanks customarily contain flammable hydrocarbons, the use of a torch or spark producing high speed cutter is essentially ruled out. Thus, the security housing device according to the present invention is relatively tamper proof.

Figure 3:
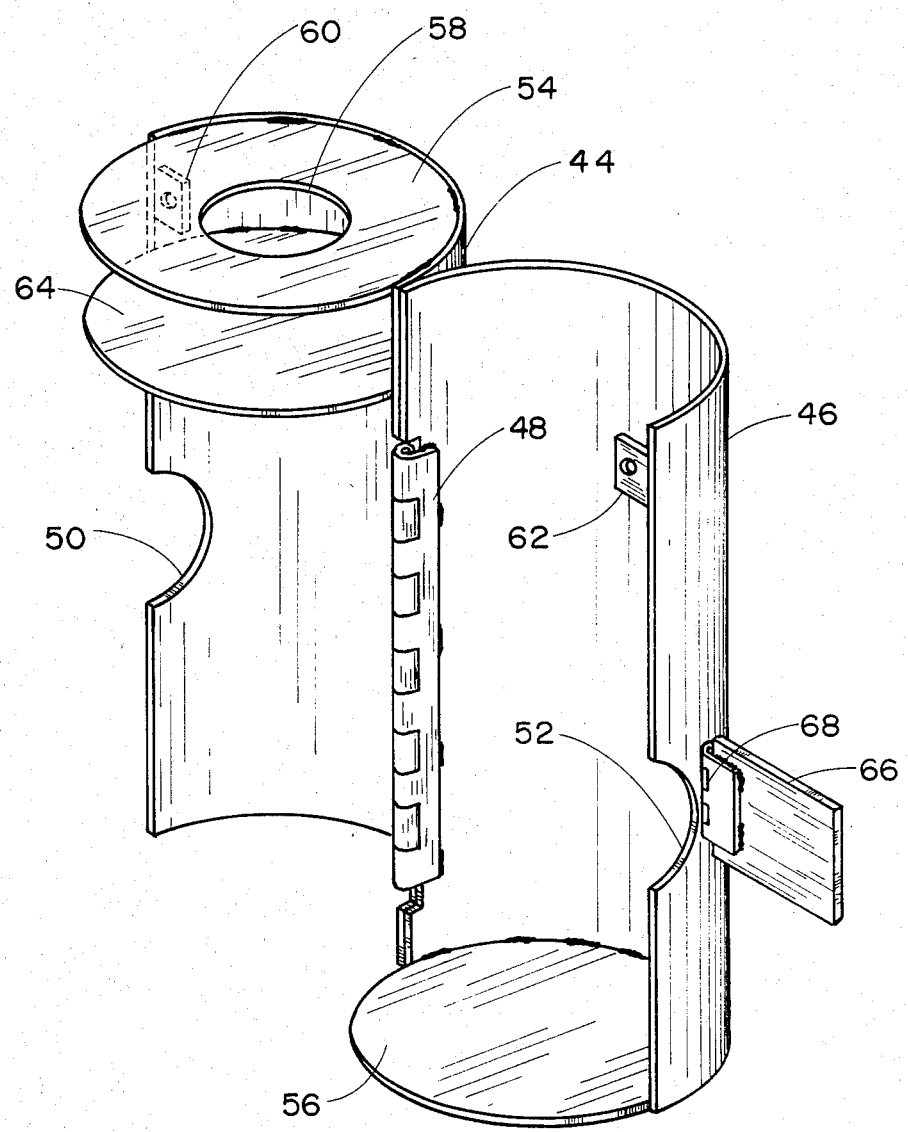
FIG. 3 is a perspective view analogous to FIG. 2 of an alternate embodiment of the security housing according to the present invention.

FIG. 3 illustrates an alternate embodiment of the present invention. As illustrated, the half clamshells 44 and 46 are pivotally attached by hinge 48 along one side. A pair of notches 50 and 52 opposite hinge 48 allow the valve pipe to enter the housing (or more specifically, allow the housing to surround the valve). Again, a top surface 54 and bottom surface 56 essentially complete the security enclosure. The top 54 is equipped with an opening 58 intended to allow manual insertion and removal of a padlock that threads through eyelets 60 and 62. Because the opening is on the top, an additional intermediate lid or surface 64 is present above the valve and below the padlock eyelet latches such as to prevent unauthorized access to the valve via the top opening 58. And as in the previous embodiment of FIG. 2, a mounting bracket 66 with hinge 68 is provided to attach the device to an oil storage tank.

The specific embodiment of FIG. 3 is particularly useful in areas where bottom access to the lock is either impossible or undesirable (such as low lying valves in areas of heavy snow or the like).

In the broadest sense, the security apparatus of the present invention involves two half clamshells of generally any shape provided they are compatible with the valve to be enclosed and are pivotally attached to each other with perimeters that conform to each other when closed forming a hollow enclosure. Thus, the specific geometric shape and size of the half shells are arbitrary. However, certain design considerations are advantageously incorporated into the structure. Preferably, the hinges are positioned and attached internally to the clamshell such that the hinge pins cannot be removed when the security housing is locked around a valve. Similarly, slight offsets are employed around the hinges and close tolerances at the perimeter, top and bottom are employed to reduce the likelihood of inserting a pry bar or the like.

The actual construction and attaching of the security housing to the storage tank 66 or to the valve pipe extending from the storage tank can be accomplished by any method well known in the art. Preferably, the device is fabricated out of heavy gauge steel by welding or other appropriate technique.

Various alternate hinging arrangements can be provided. Thus, for elevated valves, the clamshell can readily be mounted such that it opens and swings downward away from the valve rather than sideways. In principle, the device could also swing upwards, but preferably a side motion (either right or left) is preferred.

The advantages of using the security housing lock system for oil storage tank valves according to the present invention are considered numerous. The overall device is relatively convenient and simple to operate, highly reliable, structurally durable, yet relatively inexpensive. The unit is considered highly versatile in that just a few sizes and shapes will fit most commonly employed oil storage tank valves and the like. And most of all, the use of the security housing according to the present invention results in significant reduction in the risk of tampering, theft or other unauthorized access to the valves on a storage tank.

Having thus described the preferred embodiments with a certain degree of particularity, it is manifest that many changes can be made in the details of construction, arrangement and fabrication of the elements and their uses without departing from the spirit and scope of the invention. Therefore, it is to be understood that the invention is not limited to the embodiments set forth herein for purposes of exemplification, but is to be limited only to the scope of the attached claims, including a full range of equivalents to which each element thereof is entitled.

We claim:

1. A security housing for locking a storage tank valve comprising:
(a) a first half housing adapted to surround and enclose one half of a valve attached to a storage tank, wherein said first half housing consists of an essentially rigid exterior surface and hollow concave interior terminating in an essentially planar perimeter that aligns with the perimeter of a second half housing;
(b) a second half housing adapted to surround and enclose the other half of a valve attached to a storage tank wherein said second half housing consists of an essentially rigid exterior surface and hollow concave interior terminating in an essentially palnar perimeter that aligns with the perimeter of said first half housing;
(c) a first hinge means attached to a portion of the perimeter of both first and second half housings such that said first and second half housings pivotally open and close about said hinge and reversibly surround said valve;
(d) at least one notched opening in said perimeter of said half housing/adapted to allow said half housing to close around said valve with the pipe leading from the storage tank to the valve passing through said opening;
(e) a second hinge means attached to said security housing essentially adjacent to said notched opening when said security housing is closed around the valve;
(f) a support means pivotally attached to said second hinged means and adapted to be permanently fastened to the storage tank near the valve;
(g) a pair of padlock eyelet means wherein each of said padlock eyelet means is individually attached to said perimeter of each of said separate half housings such that the eyelets of said padlock eyelet means project inwardly to said half housings and align and accept a padlock when said half housings are closed around said valve; and (h) an opening within said security housing adapted to allow for manual insertion and removal of a padlock used to lock said safety housing.

2. A cylindrical security housing for locking around a storage tank valve comprising:
(a) a first hollow half cylinder consisting of a semi-cylindrical sidewall;
(b) a second hollow half cylinder consisting of a semi-cylindrical sidewall;
(c) a hinge operatively attached to the outer edge of said sidewalls of separate half cylinders such that said half cylinders open and close in a clamshell fashion;
(d) at least one top member attached to one of said hollow half cylinders such as to form a top enclosure when said half cylinders close in a clamshell fashion;
(e) at least one bottom member attached to one of said hollow half cylinders such as to form a bottom enclosure when said half cylinders close in a clamshell fashion;
(f) a first opening notched out of said other sidewall edges opposite said hinge;
(g) a hinged tank attachment means pivotally attached to one of said half cylinders near said first opening;
(h) a pair of padlock eyelets each attached to said perimeter of separate half cylinders and directed inwardly to said security housing; and
(i) a second opening in said security housing adapted to allow manual access to said inwardly directed eyelets.

3. A cylindrical security housing of claim 2 wherein said top member is a circular member attached to the top edge of one of said half cylinders and wherein said bottom member is a circular member attached to the bottom edge of one of said half cylinders.

4. A cylindrical security housing of claim 2 wherein said top member is a pair of semi-circular members each attached to the top edge of each of said separate half cylinders and wherein said bottom member is a pair of semicircular members each attached to the bottom edge of each of said separate half cylinders.

5. A cylindrical security housing of claim 2 wherein said second opening is in the bottom of said security housing.

6. A cylindrical security housing of claim 2 wherein said second opening is in the top of said security housing.

* * * * *